(12) United States Patent
Chen

(10) Patent No.: US 7,046,654 B2
(45) Date of Patent: May 16, 2006

(54) EFFICIENT RADIO RECEPTION METHOD FOR AUTOMATIC FREQUENCY PLANNING

(75) Inventor: Dayong Chen, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 973 days.

(21) Appl. No.: 10/096,502

(22) Filed: Mar. 12, 2002

(65) Prior Publication Data

US 2003/0174671 A1    Sep. 18, 2003

(51) Int. Cl.
*H04B 7/212*    (2006.01)

(52) U.S. Cl. .................. 370/347; 370/328; 370/337

(58) Field of Classification Search ........... 370/252, 370/328, 337, 347
See application file for complete search history.

(56) References Cited

U.S. PATENT DOCUMENTS 5,663,958 A * 9/1997 Ward .................. 370/347

* cited by examiner

*Primary Examiner*—Chi Pham
*Assistant Examiner*—Tito Pham
(74) *Attorney, Agent, or Firm*—Coats & Bennett, P.L.L.C.

(57) ABSTRACT

A network receiver is dynamically configurable to process access bursts received from mobile stations as both normal-type and abbreviated-type access bursts. With this capability, radio signal measurement data may be collected in the network cell or sector in which the receiver is positioned for signals originating from mobile stations operating in surrounding cells, whether or not those surrounding cells use the same burst structure. In an exemplary implementation, the receiver determines whether access burst data exhibits a lower error rate when processed as a normal burst, or when processed as an abbreviated burst. The data derived from the processing approach that yields the lower error rate is then compared with an error threshold defining an unacceptable error level for the burst data. If the data is below the threshold, it is retained for post-processing analysis, where it is used to develop accurate inter-cell measurement data for the network.

20 Claims, 10 Drawing Sheets

BURST - N: | GR | PREAM | SYNC (TS) | DATA 1 | SYNC+ | DATA 2 |

BURST - A: | GR | PREAM | SYNC (TS) | DATA 1 | SYNC+ | DATA 2 | AG |

GR = GUARD & RAMP
PREAM = PREAMBLE
SYNC(TS) = SYNC WORD - TRAINING SEQUENCE
SYNC+ = ADDITIONAL KNOWN SEQUENCE
AG = ADDITIONAL GUARD

FIG. 10

EFFICIENT RADIO RECEPTION METHOD FOR AUTOMATIC FREQUENCY PLANNING

BACKGROUND OF THE INVENTION

The present invention generally relates to wireless communication networks, and particularly relates to determining radio interference characteristics within a wireless communication network.

Costs and other practical considerations, such as the ability to acquire suitable tower locations, drive wireless network configurations toward an optimum siting solution where a minimum arrangement of cellular base stations within the network coverage area provides the needed radio coverage characteristics. Wireless network planning focuses on determining the best sites for the radio base stations within the coverage area.

Software planning tools use radio propagation models in combination with terrain data associated with the planned coverage area to provide estimates of radio signal propagation characteristics. However, because of the significant complexity involved in real-world radio signal propagation, computer modeling seldom provides a complete picture of radio signal propagation within the network area. Network planners adopt various other approaches to garner more accurate and complete information about radio signal propagation and attendant interference conditions within the coverage area.

Several non-simulation approaches allow wireless service providers to develop detailed, accurate information about actual radio signal propagation, and the actual nature and extent of radio interference within the network coverage area. One technique uses dedicated roving mobile stations that move through various coverage areas of the wireless network to collect signal data. While this approach does allow accurate characterization of signal propagation and interference within the network, it is time consuming and expensive. Other techniques involve the use of network receivers, namely, radio base station receivers, installed at fixed locations throughout the network coverage area. Generally, these fixed receivers are used to collect data from random mobile stations operating within one or more of the coverage areas associated with the network receivers.

With this latter approach, a wireless service provider can use existing base stations to develop a detailed picture of signal propagation and interference, particularly inter-cell interference, within the wireless coverage area. Such information aids in the expansion and modification of the existing wireless network, and may be of great use in terms of implementing new, overlaid wireless services within the same coverage area. An example of this approach would be where a given wireless service provider begins overlaying advanced wireless services, such as third generation (3G) services onto an existing second generation (2G) wireless network.

One difficulty with the use of network base stations is that each base station is configured to receive and process access burst types appropriate for its coverage area. Generally, a given base station is configured to either process normal access bursts or abbreviated access bursts depending on cell size. Thus, during interference measurement modes, the base station may be expected to measure signals originating from mobile stations operating in surrounding cells that impose a different access burst requirement on mobile stations that is used by the base station performing the measurement.

BRIEF SUMMARY OF THE INVENTION

The present invention provides a method and apparatus for collecting detailed radio signal measurement data within a wireless communication network. One or more radio base stations within the wireless communication network include a receiver configured to support normal wireless communication with mobile stations operating in the corresponding coverage area when the receiver is in a normal mode of operation, and configured to collect signal measurement data when the receiver is placed in a measurement mode.

Within the context of time division multiple access (TDMA) networks, the inventive receiver dynamically processes both normal and abbreviated access bursts when it is in measurement mode. Dynamic processing of both burst types allows the receiver to collect measurement data from mobile stations in its coverage area and from mobile stations operating in surrounding coverage areas served by other base stations, and which may use a different burst type. Processing both normal and abbreviated burst types reduces the amount of time necessary to collect measurement data from the network that may be used in automatic frequency planning operations.

In an exemplary environment, the receiver is part of radio frequency transceiver resources within a radio base station in a wireless communication network. The receiver includes a demodulator that detects bits within a received signal, and provides demodulated bits to a decoder. Generally, the demodulator assumes a normal access burst type, which in TIA/EIA/IS-136 TDMA networks comprises 244 bits. The demodulated bits are provided to a decoder, which, in measurement mode, processes the demodulated bits first assuming that the received burst was a normal burst, and then again assuming that the received burst was an abbreviated burst. A receiver controller cooperates with the decoder to determine whether the data set produced by the normal burst processing has a lower error rate than the data set produced by abbreviated burst processing. The data set having the lower error rate is compared to an error rate threshold, which serves as the safeguard against retaining erroneous data, and is retained if its error rate is below this threshold. More specifically, retained data comprises a mobile station identifier and a received signal strength measurement. This retained data may be sent by the receiver controller to an overall base station controller, where it may be stored locally or may be transferred to a post-processing facility, which may reside in a mobile switching center (MSC).

In a wireless communication network where one or more of the radio base stations include receivers as described above, the network may place various ones of its coverage cells or sectors into a measurement mode, and collect measurement data from various ones of the mobile stations operating in those coverage areas. Because each radio base station operating in a measurement mode is able to process both normal and abbreviated burst types, it processes incoming access bursts from mobile stations in surrounding coverage areas regardless of whether those coverage areas use the same burst type. Processing both burst types at the same time saves significant test time by avoiding the necessity of having a measurement period dedicated to normal burst measurements and one dedicated to abbreviated burst measurements.

Once sufficient measurement data is obtained from the selected coverage areas in the wireless communication network, the collected data may be processed at the MSC, or at another processing entity within the network. In an exemplary approach, the measurement data is verified by matching it with independently collected mobile station access data to insure that the measurement data collected by the receivers represent actual mobile station accesses. Such verification may be performed by correlating mobile station identifiers in the measurement data with mobile station identifiers in network access logs developed over the same period during which the measurement data was collected.

One benefit of correlating collected measurement data with mobile station access logs is that the access logs include definitive identification of the particular cell or sector from within which a given mobile station originated its network access. Incorporating this access location data into measurement data processing enables determination of inter-cell interference because measurement data collected in one cell may then be correlated to access activities occurring in surrounding cells.

In this manner, the post-processing facility develops a detailed picture of radio signal propagation between various coverage areas in the network, and, from that picture, it develops accurate estimations of inter-cell interference. Processed propagation and inter-cell interference information may be used to produce graphical depictions of network propagation and interference characteristics, which in turn may be used to optimize the placement of radio resources within the network coverage areas.

BRIEF DESCRIPTION OF THE DRAWINGS

FIG. 10 is a diagram of normal and abbreviated access frames used in wireless communication networks based on TIA/EIA/IS-136 TDMA standards.

DETAILED DESCRIPTION OF THE INVENTION

Figure 1:
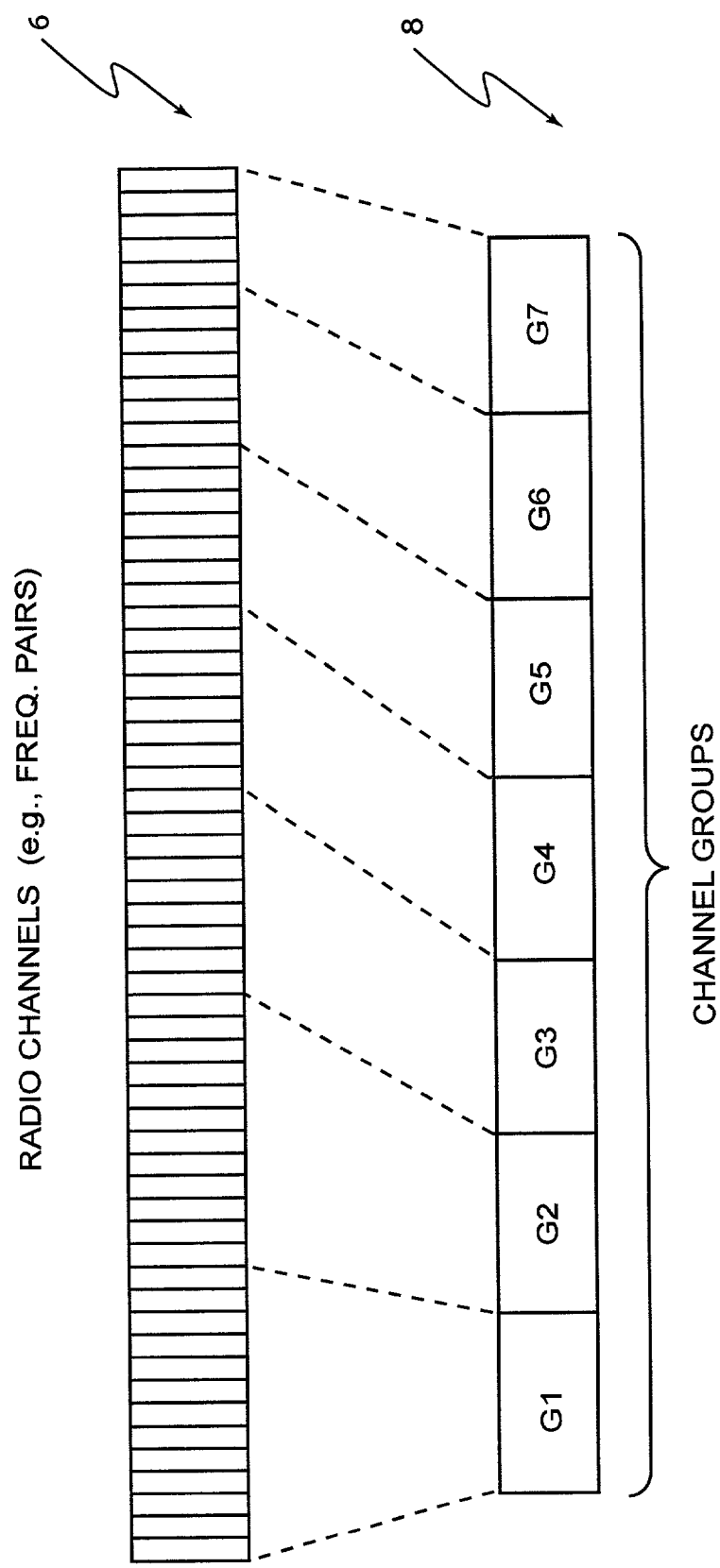
FIG. 1 is a diagram of exemplary frequency channel pairs and channel groupings as might be used within a wireless communication network.

Referring now to FIG. 1, wireless communications systems generally use a defined portion of radio frequency spectrum to support wireless signaling with the various mobile stations and other wireless devices supported by the network. In a common approach, wireless communication networks that employ time division multiple access (TDMA) techniques divide the allocated radio spectrum into a plurality of radio channels 6, with each channel typically comprising an uplink/downlink frequency pair. Often, the channels 6 are segregated into one or more channel groups 8. In understanding how these channel groups 8 are used within a given wireless communication network to provide communication service coverage over a given coverage area, one must first understand some of the basic network building blocks.

Figure 2:
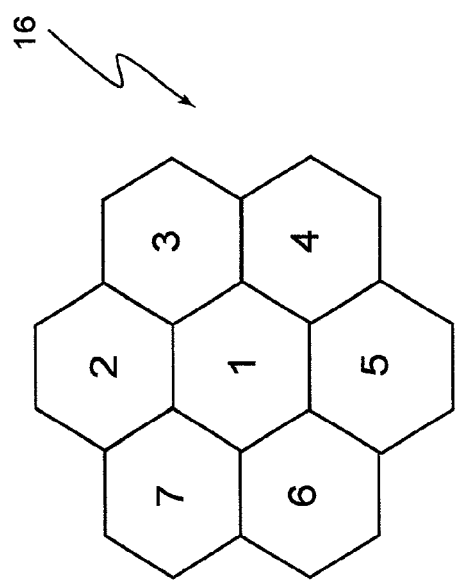
FIG. 2 is a diagram of a base station and its corresponding coverage area or cell.
Figure 3:
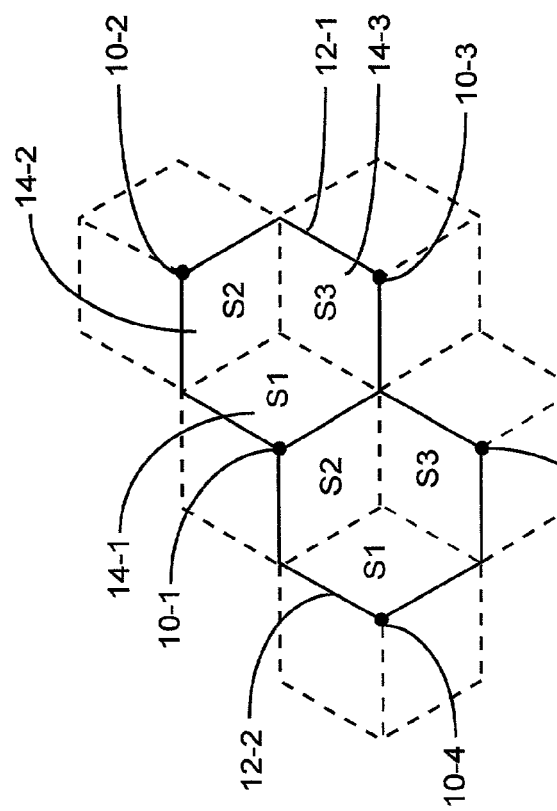
FIG. 3 is a diagram of several base stations providing sectorized cellular coverage.

FIG. 2 illustrates a wireless network base station 10, and its corresponding radio coverage area 12, which is commonly referred to as a "cell" 12. While FIG. 2 depicts the base station 10 positioned at the center of cell 12, in actuality this configuration may not be used. FIG. 3 illustrates a sectorized approach to providing radio coverage within two cells, 12-1 and 12-2. Here, each cell 12 is divided into sectors 14. More specifically, each cell 12 is divided into three sectors, 14-1 through 14-3. Rather than positioning a base station 10 in the middle of a sector 12, this sectorized approach uses three base stations 10, with each base station 10 providing coverage for one of the three sectors 14 comprising each cell 12. With this approach, a given base station 10 generally provides coverage for three sectors 14, with each one of the three sectors residing in a different cell 12. The balance of the discussion herein generally assumes that a cell 12 represents a discrete network coverage area, although it should be understood that in a practical application sectors might represent the smallest discrete network coverage area.

Figure 4:
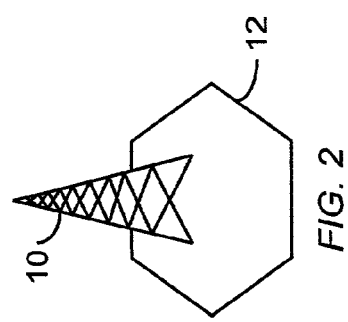
FIG. 4 is a diagram of cell clusters and illustrates exemplary cell-channel group assignments.
Figure 5:
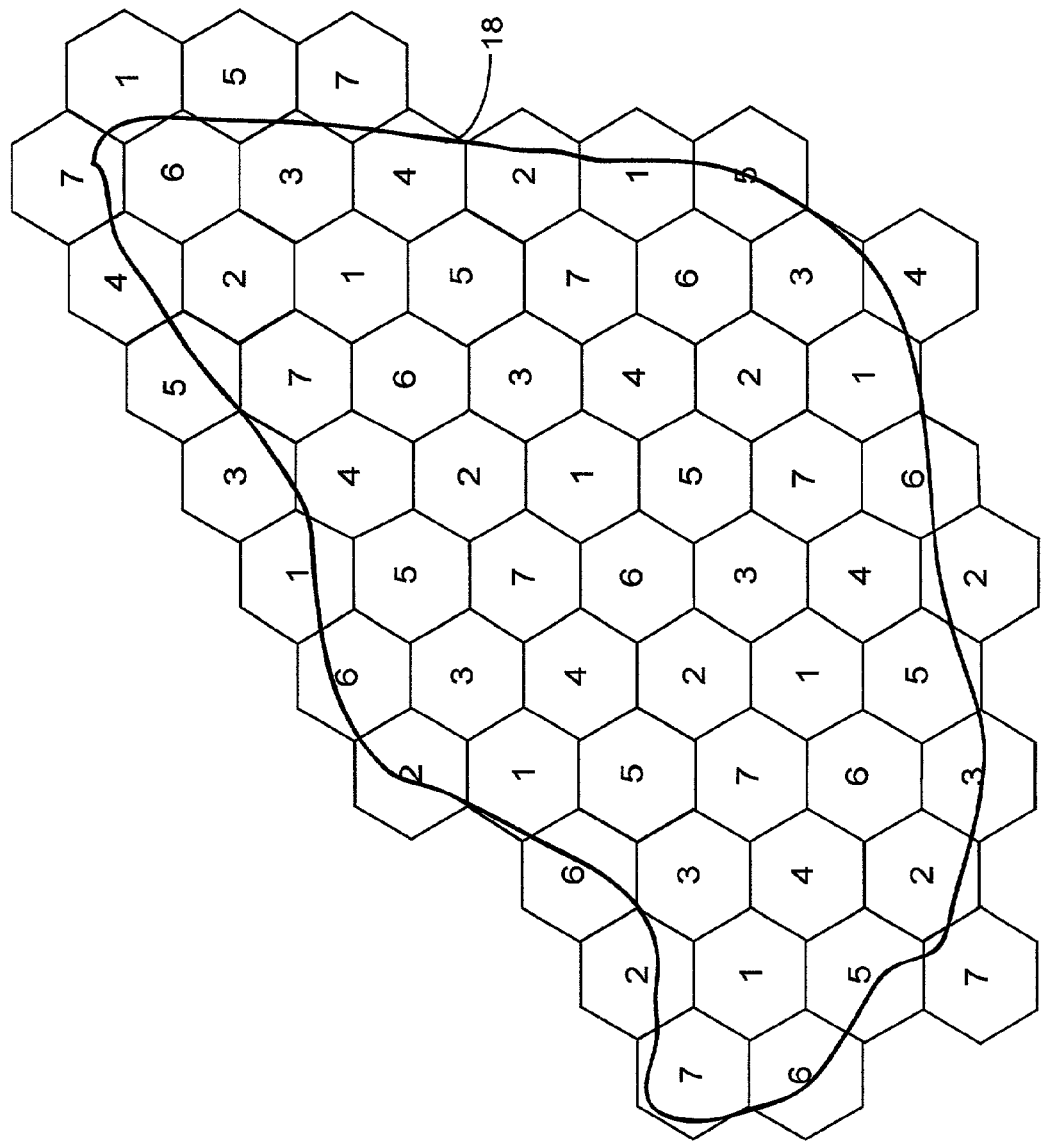
FIG. 5 is a diagram of cluster-based wireless network coverage for a given geographic area.

FIG. 4 illustrates a cell cluster 16 comprising an arrangement of seven cells 12. Cells are labeled 1 through 7 in a specified arrangement, indicating that channel groups 1 through 7 are applied to the cluster 16 in the specified arrangement. FIG. 5 illustrates the use of repeating clusters 16 to cover a given geographic region 18. By arranging the clusters 16 in this manner, a wireless communication network reuses frequencies from cluster to cluster. For example, like number cells 12 in FIG. 5 each use the same channel group 8 of radio frequency channels 6.

Figure 6:
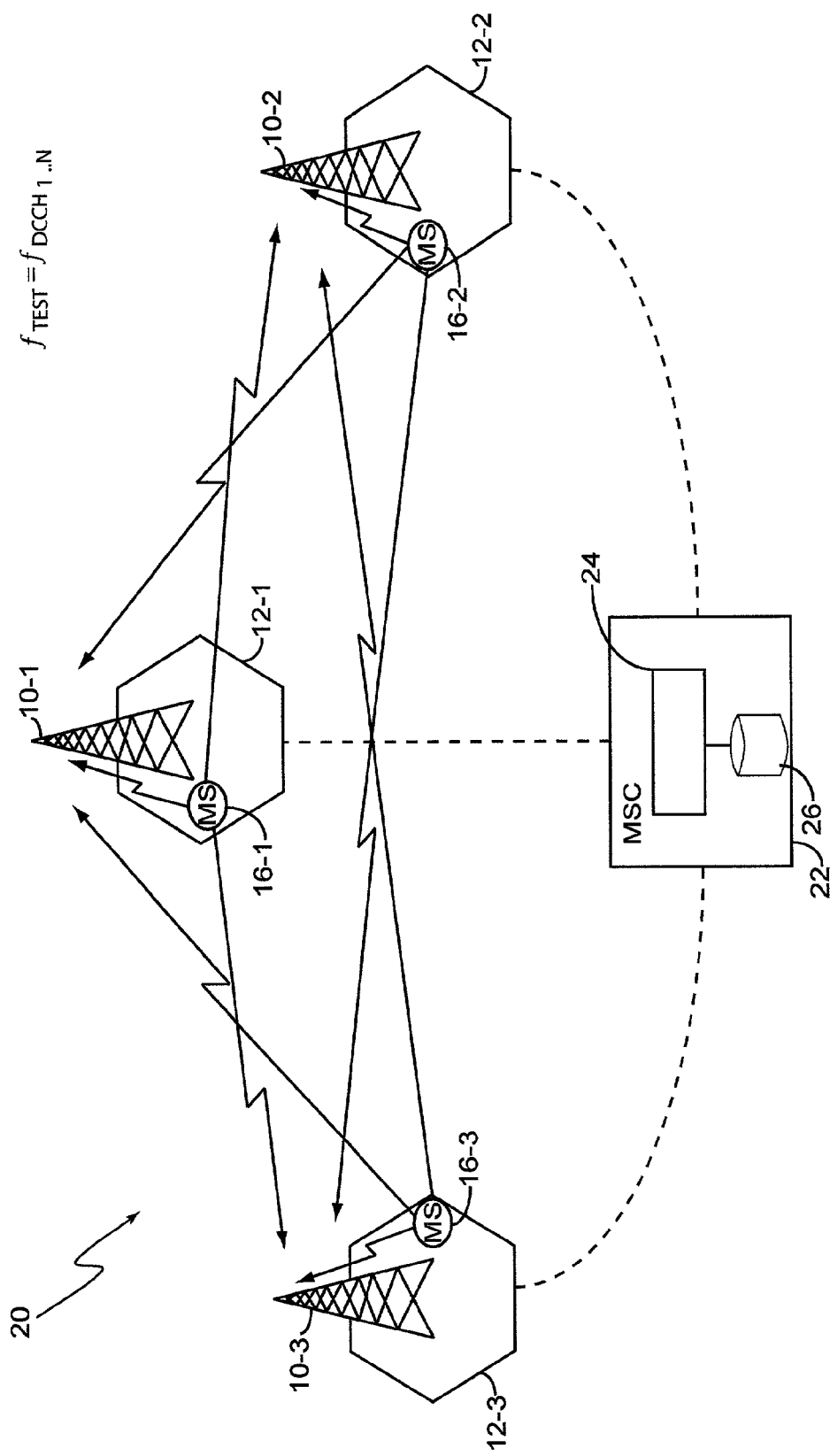
FIG. 6 is a diagram of an exemplary wireless communication network as might be used to provide the cellular coverage depicted in FIG. 5.

FIG. 6 illustrates at least a portion of an exemplary wireless communication network 20 as might be used to provide wireless communication coverage in the cellular arrangement depicted in FIG. 5. Here, a mobile switching center (MSC) 22 is communicatively coupled with three base stations, 10-1, 10-2, and 10-3. Each base station 10 provides service coverage for a corresponding cell 12. One or more mobile stations 16 operating in each of the cells 12 communicates via radio frequency signaling with at least one of the base stations 10. Generally, each cell 12 supports a plurality of mobile stations 16. In operation, as a mobile station 16 moves from one cell 12 to the next, the wireless communication network 20 switches support for that mobile station 16 from the base station 10 in the first cell 12 to the base station 10 in the next cell 12. This process of switching between base stations 10 is generally referred to as "handoff."

While handoffs generally involve the explicit transfer of control from one base station 10 to the next, it should be apparent from the diagram that each base station 10 generally receives signals not only from the mobile stations 16 operating under its control within its corresponding cell 12, but also from other mobile stations 16 in surrounding cells 12. Indeed, this reception of signals from one or more mobile stations 16 operating in surrounding cells represents a source of interference within the wireless communication network 20, and controls to a large extent the ability to reuse frequencies within the wireless communication network 20. The ability to reuse frequencies within the wireless communication network 20 influences overall network capacity, and impacts the expense of implementing and expanding the network 20. Thus, developing an accurate, clear understanding of the nature of inter-cell interference within a given geographic region is vital in determining optimum base station placement ("siting"), cell configuration, and frequency reuse schemes.

Indeed, such information is important not only to frequency planning within the context of second generation (2G) TDMA communication networks, but also plays an important role in the planning and implementation of evolving 2.5G wireless networks and third generation (3G) wireless networks, where such equipment is co-sited with existing 2G base stations 10.

As wireless communication system providers begin transitioning their wireless services from 2G networks to 3G networks, co-siting 3G base stations 10 with existing 2G base stations 10 will become commonplace. Co-siting simply means physically co-locating a 3G base station 10 with an existing 2G base station 10. For example, a wireless service provider having an installed wireless communication network 20 may install 3G base stations 10 at one or more of its existing 2G base stations 10. Optimal placement of these 3G base stations 10 within the coverage area of the network 20 depends on a detailed understanding of the interference characteristics within that coverage area.

Because of the tremendous number of variables involved in radio signal propagation, even detailed computer simulation of a proposed or existing wireless communication network 20 generally does not reveal all of the information needed for optimum cell placement. Automatic frequency planning (AFP) represents one approach to detailed analysis of signal propagation and associated interference within the network 20. With AFP, the network operator uses existing network receivers within the base stations 10 to measure inter-cell interference at one or more locations within the network 20.

AFP operations are complicated by certain operational details commonly employed in TDMA networks. More specifically, interference measurement operations are complicated by the fact that a given base station 10 is nominally set up for either normal or abbreviated burst processing on the reverse digital control channel (DCCH) for mobile-originated DCCH access bursts. However, the point of interference measurement is to process access bursts received from mobile stations 16 operating in surrounding cells 12. Because the great likelihood is that at least some of those surrounding cells use a differing burst type, the base station 10 generally has to contend with both normal and abbreviated access bursts during measurement operations.

Generally, the relative size of a cell 12 determines whether the base station 10 supporting service in that cell 12 is configured for normal or abbreviated access burst operation. In a relatively large cell 12 where the propagation distance is appreciable, abbreviated bursts are used by mobile stations 16 in that cell 12 to provide extra guard time at the end of the burst. Extra guard time prevents undesirable overlap between TDMA slots. Conversely, mobile stations 16 operating in relatively small cells 12 use normal burst structures, which eliminates the extra guard time to improve spectral efficiency.

When a mobile station 16 first accesses the wireless communication network 20, it transmits an origination access burst to its serving base station 10 on the reverse DCCH. It does so without benefit of any information regarding the distance between the mobile station 16 and the base station 10. This origination access burst is generated either as a normal access burst or as an abbreviated access burst, depending on whether the cell 12 is a large cell or a small cell.

Typically, a given cell 12 has a fixed configuration as either a large or small cell, and the base station 10 providing coverage for that cell 12 transmits information about the cell's configuration on a forward link digital control channel (DCCH). Mobile stations 16 entering the cell 12 read this configuration information, and set their access burst structure accordingly. Thus, mobile stations 16 operating within the given cell 12 generate access bursts either as normal bursts or as abbreviated bursts depending on the configuration information transmitted by the base station 10 for that cell 12. A mobile station 16 moving from a large cell 12 to a small cell 12 will change its access burst structure accordingly as it moves into the small cell 12, and vice versa.

As explained above, these differing burst structures complicate AFP operations. To better visualize the complication, one need only refer to FIG. 6. In that diagram, one sees that a given base station 10 receives access bursts from mobile stations 16 operating within its corresponding cell 12, but also receives access bursts from mobile stations 16 operating in surrounding cells 12.

In a typical communication network 20, a base station 10 in a given cell 12 receives signals from mobile stations 16 in nearby cells 12. For example, base station 10-1 receives access bursts from mobile stations 16 operating in cells 12-1, 12-2, and 12-3. If cells 12-1 and 12-3 are small cells, while cell 12-2 is a large cell, base station 10-1 receives normal access bursts from mobile stations 16 operating in cells 12-1 and 12-3, but receives abbreviated access bursts from mobile station 16 operating in cell 12-2. Base stations 10-2 and 10-3 similarly receive a mix of normal and abbreviated access bursts.

One should understand that the network 20 could include essentially any combination of large and small cells 12. In any case, the upshot of this intermixing of small and large cells 12 is that the process of measuring interference at a given one of the base stations 10 is complicated by the need to process both normal and abbreviated access bursts during the measurement of inter-cell interference.

Figure 7:
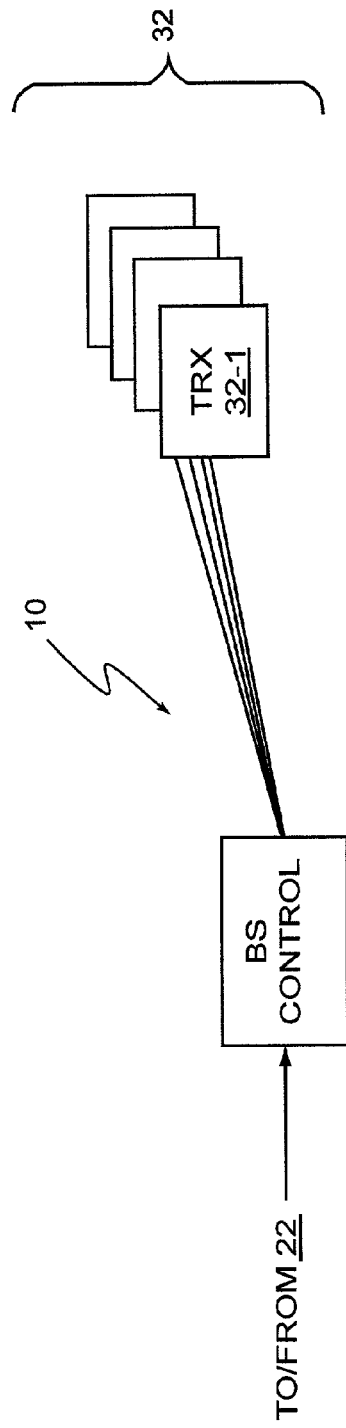
FIG. 7 is a diagram of an exemplary radio frequency (RF) transceiver as might be used in the wireless network base stations of FIG. 6 or FIG. 2.

In accordance with the present invention, base stations 10 may be placed in a measurement mode wherein received access bursts are dynamically processed as both normal and abbreviated bursts. FIG. 7 illustrates exemplary details for such base stations 10, and depicts the base station 10 as comprising a base station controller 30 and a plurality of radio frequency (RF) transceiver resources 32. Generally, the base station 10 configures its transceiver resources 32 in accordance with the channel group assignment associated with its cell 12. That is, the base station 10 configures the transceiver resources 32 using the radio frequency channel pairs 6 assigned to its corresponding cell 12.

In TDMA systems, each radio frequency channel pair 6 is used to support uplink and downlink communication with one or more users (i.e., mobile stations 16). Individual users are assigned one or more repeating time slots within a series of TDMA time frames. By synchronizing to the serving base station 10, a mobile station 16 is able to transmit and receive information in its assigned time slots. Generally, one of the frequency pairs 6 assigned to the base station 10 serves as a DCCH for controlling the mobile stations 16 operating within the cell 12. However, because the DCCH normally requires only one time slot within the TDMA frames assigned to the DCCH channel pair, the remaining time slots are used to support user traffic channels (e.g., voice data).

Referring again to FIG. 5, it is commonplace to reuse the same DCCH channel assignment (frequency) across clusters 16. For example, all cells 12 using channel group 1 might use the same frequency channel pair for the DCCH. Thus, when measuring inter-cell interference within the network 20, all base stations 10 using the same DCCH frequency channel assignment may be placed in a test mode where interference on the selected DCCH frequency from surrounding cells 12 is measured at each such base station 10.

One approach to measuring such interference requires each base station 10 to listen for access bursts, and determine the received signal strength and the bit error rate estimate for each received access burst. In an exemplary approach, the base stations 10 only perform these measurement steps on origination access bursts. That is, during measurement mode, only origination-type access bursts are processed for interference measurement.

An origination-type access burst represents an attempt by a mobile station 16 to originate a call, and it is expected therefore that a user of that mobile station 16 will have suitably arranged or configured it for transmission. For example, the mobile station might normally be carried in a pocket or on a belt clip, with any antennas held retracted. To place a call, the user typically extends any antennas and holds the mobile station 16 to his or her ear. Thus, it may be expected that origination access bursts nominally correspond to typical transmit conditions at the mobile station 16. In contrast, an access burst responsive to, for example, a network-originated paging request, might be transmitted by a mobile station 16 not explicitly prepared by its user for communication with the network 20. Of course, in other embodiments of the invention, all access burst types may be processed during interference measurement operations.

In any case, processing access bursts to determine inter-cell interference requires each base station 10 to deal with both normal and abbreviated access bursts. Conventionally, base stations 10 are generally fixed during normal operation to process only one type of access burst, and this requires listening for and processing access bursts of a first type, and then reconfiguring the base station 10 to listen for and process access bursts of the other type. Because these measurement periods may be quite extended, on the order of several days for example, the need to have separate measurement intervals for the two access burst types is undesirable.

Indeed, lengthy measurement intervals represent a loss of traffic capacity to the network operator because the traffic channels on the DCCH frequency under test are unavailable for carrying user-traffic during the measurement period. Thus, minimizing the duration required for interference measurements minimizes the time during which the service provider must forego use of the affected traffic channels.

Figure 8:
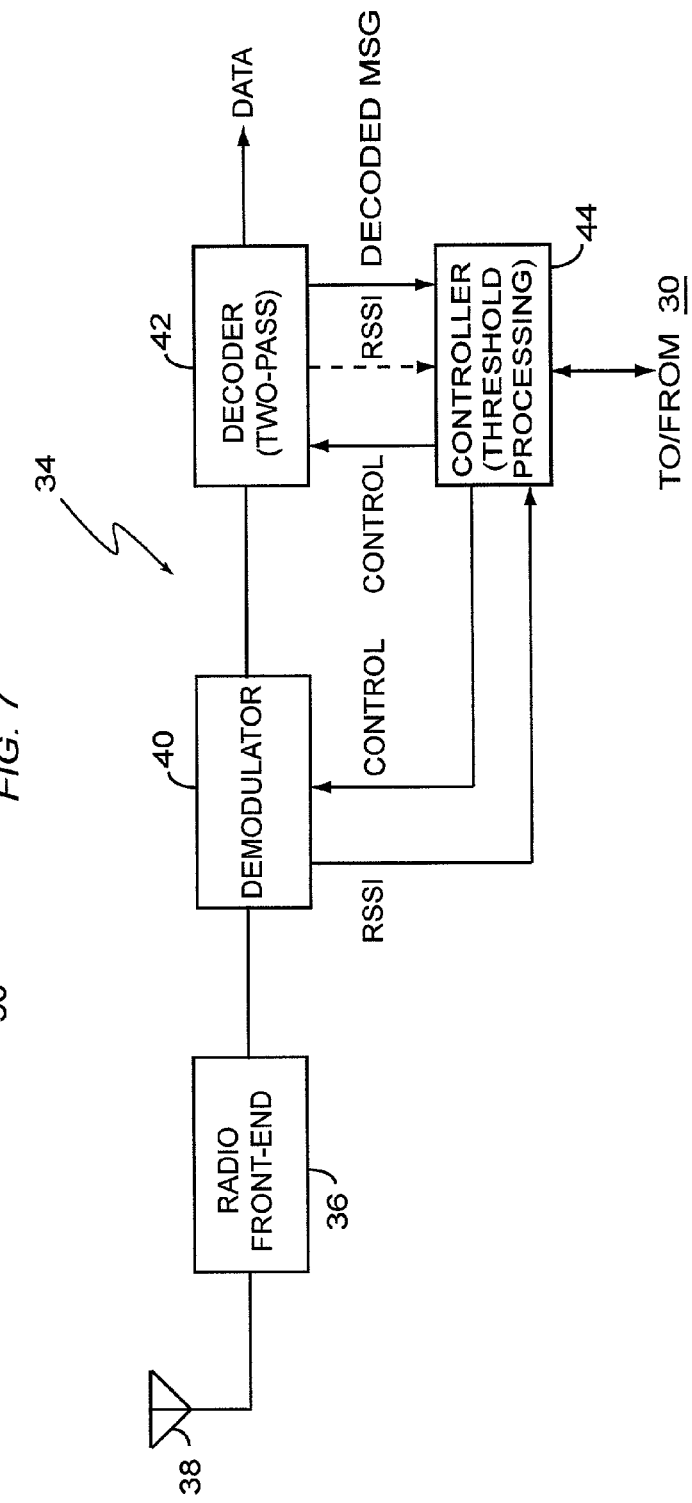
FIG. 8 is a diagram of an exemplary embodiment of the inventive network receiver, which might be used in the RF transceiver of FIG. 7.

FIG. 8 illustrates exemplary details for a network receiver 34 which may be included in the transceiver resources 32 of base stations 10. This exemplary receiver 34 is adapted to operate in a measurement mode in which it is able to perform interference measurements for both normal and abbreviated access bursts. Here, the receiver 34 comprises a radio front-end 36, which is coupled to an antenna 38 for receiving wireless signals from the mobile stations 16. The radio front-end 36 typically includes an assortment of amplifiers, filters, and analog-to-digital converters (ADCs), which are used to produce a digitized baseband signal at the output of the radio front-end 36. The baseband signal is then passed to a demodulator 40, which demodulates the transmitted bits within the received baseband signal.

In the context of processing access bursts where the network 20 is configured in accordance with TIA/EIA/IS-136, the demodulator processes all access bursts as a normal burst, and therefore extracts or otherwise demodulates 244 bits from a received access burst. It should be understood that in other TDMA-based networks, such as GSM networks, the number of bits extracted by default from a received access burst will vary with the specifications of that standard. The demodulated bits are passed to a decoder 42 which, when operating in a measurement mode, operates as a two pass decoder with the first pass producing a first data set by processing the demodulated bits as a normal burst, and the second pass producing a second data set by processing the demodulated bits as an abbreviated burst. A receiver controller 44 receives these data sets from the demodulator 42, and processes them to determine whether either one should be retained as measurement data. The receiver controller 44 is communicatively coupled to the base station controller 30, such that any retained data may be passed from the receiver controller 42 to the base station controller 30.

Figure 9:
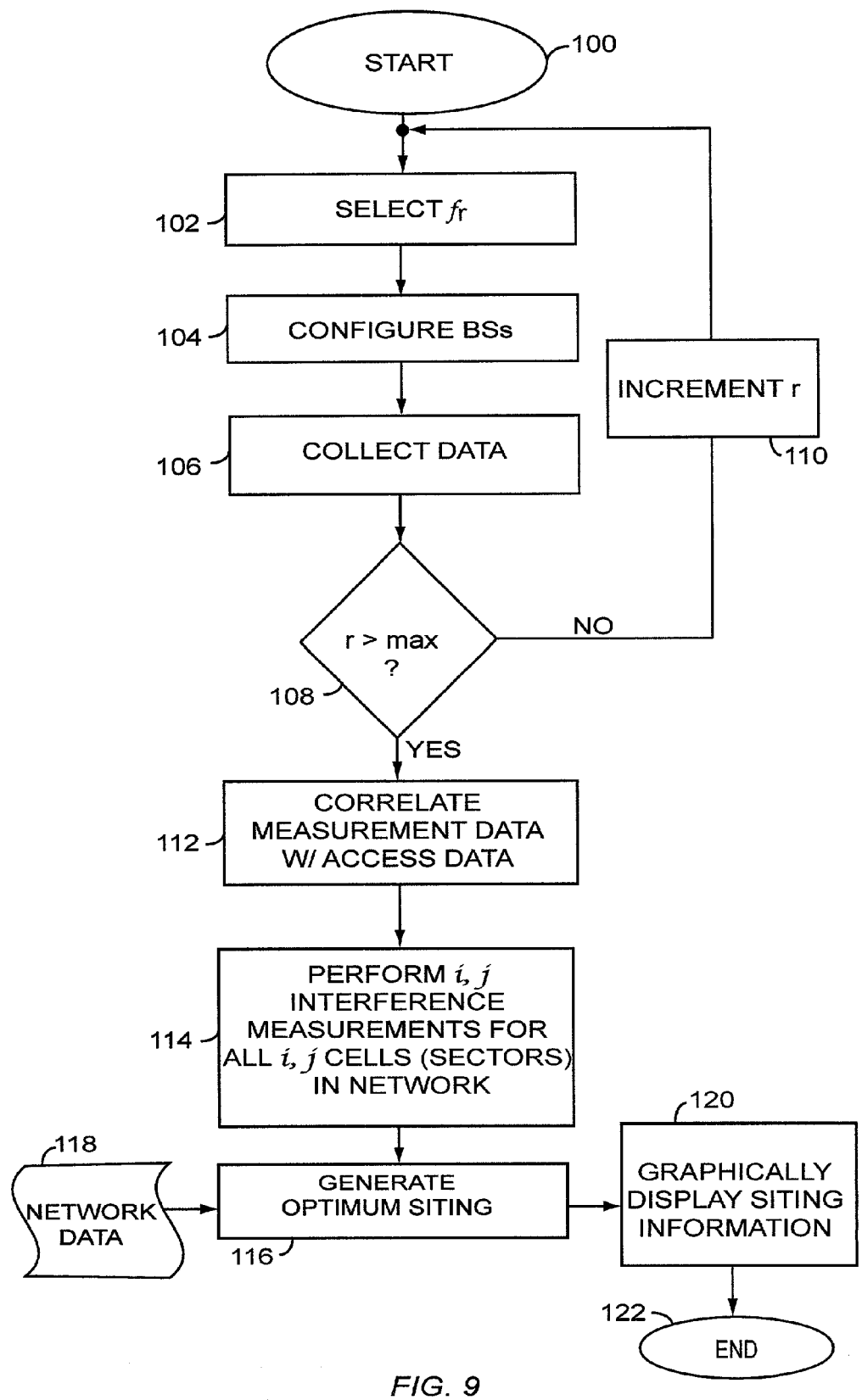
FIG. 9 is a logic flow diagram of an exemplary automatic frequency planning (AFP) process, which might be conducted for the wireless communication network of FIG. 6.

FIG. 9 illustrates a network approach to measuring inter-cell interference using the exemplary receiver 34 in one or more base stations 10. Processing starts (step 100) with the selection of a test frequency $f_t$, which test frequency represents one of the assigned DCCH frequencies used by one or more cells 12 within the network 20 (step 102). The base stations 10 that use the test frequency as their assigned DCCH frequency are configured for measurement mode operation (step 104), which entails the MSC 22 or the base station controller 30 placing one of the receivers 34 within each such base station 10 into a measurement mode of operation. While in a measurement mode, each receiver 34 is used to collect data regarding received access bursts (step 106). The collected data generally comprises received signal strength and mobile station identification associated with the received access burst, which may be used later in post-processing of the collected measurement data. Thus, in an exemplary configuration, collected data for a given access burst includes a received signal strength indicator (RSSI) and a mobile station identifier (MSID), and may include date/time stamping as needed.

Once sufficient data has been collected at the current test frequency, the network 20 determines whether additional DCCH frequencies remain to be tested (step 108). If additional frequencies remain, the next test frequency is selected (step 110), and the data collection process repeats. If no test frequencies remain to be tested, the network 20 post-processes the data collected from all of the base stations 10 used in the testing operations, which post-processing includes correlation of the measurement data from the base stations 10 with corresponding mobile station access data also collected by the network 20 during the testing periods. The access data represents confirmed accesses by particular ones of the mobile stations 16 and may be used to verify that the measurement data collected by the various base stations 10 during testing correspond to confirmed mobile station accesses. The correlation process also identifies the specific cells 12 within the network 20 from which the various access bursts originated.

Access information further allows the network 20 to perform inter-cell interference measurements (step 114) based on analyzing the measurement data for some or all cells 12 (or sectors) within the network 20. Detailed radio frequency propagation data may be extracted from this analysis (step 116), and this propagation information may then be used, in combination with network data 118, to generate optimum siting information. Optimum siting information may then be processed such that a network planner or system operator is presented with a graphical display of the optimum siting arrangement for the area covered by network 20, at which point processing ends (step 122).

Reduction in overall inter-cell interference measurement test time represents a key advantage of using the inventive receivers 34 within the base stations 10 of network 20, which makes such testing more convenient. The ability to conveniently generate detailed interference information based on actual radio signal propagation characteristics for the coverage area of network 20 is particularly advantageous when the service provider is undertaking or planning to undertake the implementation of co-sited base stations within the existing network 20, such as might be done when rolling out 3G wireless services. In that sense, then, the network data used in step 118 of the above logic flow may include specific configuration information related to the planned co-sited base stations.

In understanding how the receiver 34 processes received access bursts as both normal and abbreviated bursts, one must first understand the differences between the two burst types. FIG. 10, for TIA/EIA/IS-136, illustrates both a normal burst, BURST-N, and an abbreviated burst, BURST-A. Both burst types include an initial guard and ramp time, a preamble, a synchronization or training sequence, first data, followed by an additional synchronization sequence, and end with second data. It is in this final data period that the two burst types differ. Because large cells 12 may incur significant signal propagation delay due to the size of the cell, the final data in an abbreviated burst type includes fewer data bits, which are replaced with additional guard bits. These additional guard bits provide a certain amount of time at the end of the burst where adjacent TDMA slots can overlap without loss of data.

Figure 11:
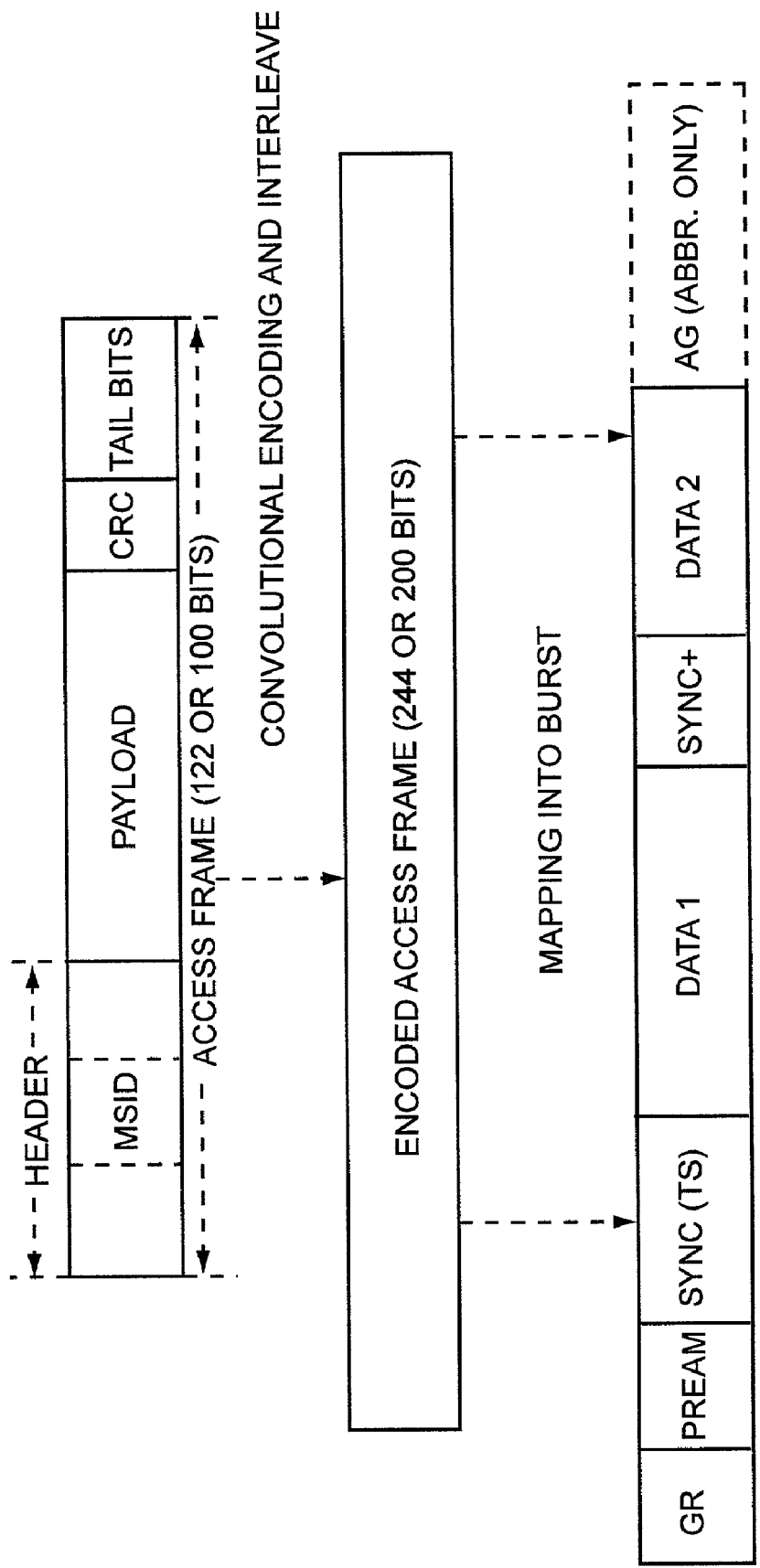
FIG. 11 is a diagram of burst mapping details for the normal and abbreviated frames of the FIG. 10.

FIG. 11 illustrates exemplary frame details for TIA/EIA/IS-136 systems, with the understanding that these exemplary details will vary in other TDMA systems, such as those based on the GSM standards. Here, an access frame comprises 122 bits for normal access bursts and 100 bits for abbreviated access bursts. Both abbreviated and normal access frames include a header section, a payload section, a CRC section, and tail bits. The header section includes a mobile station identifier (MSID), which allows the receiving base station 10 to identify the particular mobile station 16 from which the access burst was received. Mobile stations 16 use convolutional encoding and data interleaving to produce an encoded access frame, which comprises 244 or 200 bits, depending on whether the starting access frame was a normal or abbreviated frame type. The mobile station 16 then maps the encoded access frame into an access burst structure, which was described in detail in FIG. 10. Thus, access bursts comprise 244 bits for normal burst types and 200 bits for abbreviated burst types in the "DATA 1" and "DATA 2" fields of the respective burst types.

Within receiver 34, the decoder 42 and controller 44 cooperate to provide two pass decoding for received access bursts when the receiver 34 is in a measurement mode of operation. This two pass processing begins once the decoder 42 has received a first set of 244 detected bits from the demodulator 40. This first set of bits corresponds to a received access burst.

Figure 12A:
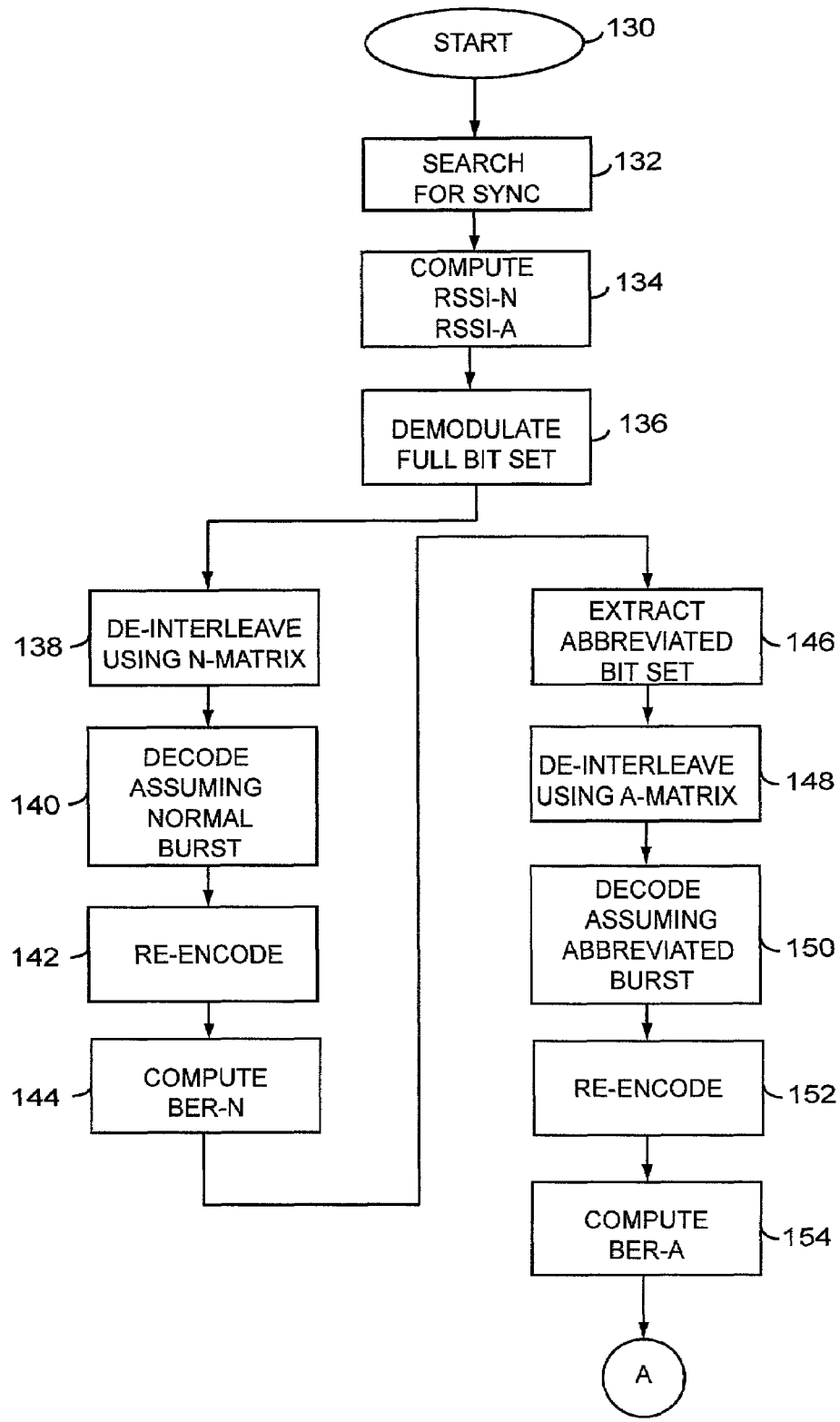
FIGS. 12A and 12B are logic flow diagrams of exemplary receiver operations during AFP measurements for the receiver of FIG. 8.

FIGS. 12A and B illustrate exemplary processing within the receiver 34. Operations begin (step 130) with the receiver 34 searching for a synchronization word within a received access burst (step 132). Once the demodulator 40 has identified the synchronization portion of the received access burst, it computes a received signal strength for a normal burst (RSSI-N), and a received signal strength for an abbreviated burst (RSSI-A), which does not include the radio signal samples corresponding to the additional guard time (step 134). The demodulator 40 then demodulates a full (normal) bit set from the received access burst (step 136). This full bit set is then passed to the decoder 42 which de-interleaves the full bit set using a normal burst de-interleaving matrix (step 138).

The de-interleaving operation produces a first de-interleaved bit set, which is then decoded assuming that normal burst encoding was applied by the transmitting mobile station 16 (step 140). Decoding operations produce first data, which is then re-encoded (step 142) using the same convolutional encoding scheme that would have been applied by the mobile station 16 in generating a normal access burst. The re-encoded first data is then compared to the first de-interleaved set of data obtained in step 138 to determine a bit error rate estimate between the two data sets (step 144). Thus, at this point, receiver 34 has determined a received signal strength estimate for the received burst (RSSI-N) and a bit error rate estimate for the first data based on the assumption that the received access burst was a normal burst.

The decoder 42 then begins its second pass of operations, wherein it extracts an abbreviated bit set from the full bit set provided by the demodulator 136 (step 146). This abbreviated bit set comprises the first 200 bits of the 244-bit set. The decoder 42 then de-interleaves this abbreviated bit set using an abbreviated burst de-interleaving matrix (step 148). This operation produces a second set of de-interleaved data, which is then decoded with the assumption that the second de-interleaved data corresponds to an abbreviated burst type (step 150). These decoding operations produce second data, which is then re-encoded using the same convolutional encoding scheme that would have been applied by the mobile station 16 in generating an abbreviated burst. This re-encoding produces a second set of re-encoded data (step 152). The second set of re-encoded data is compared to the second set of de-interleaved data obtained in step 148 to produce a bit error rate estimate for the second data (step 154).

Figure 12B:
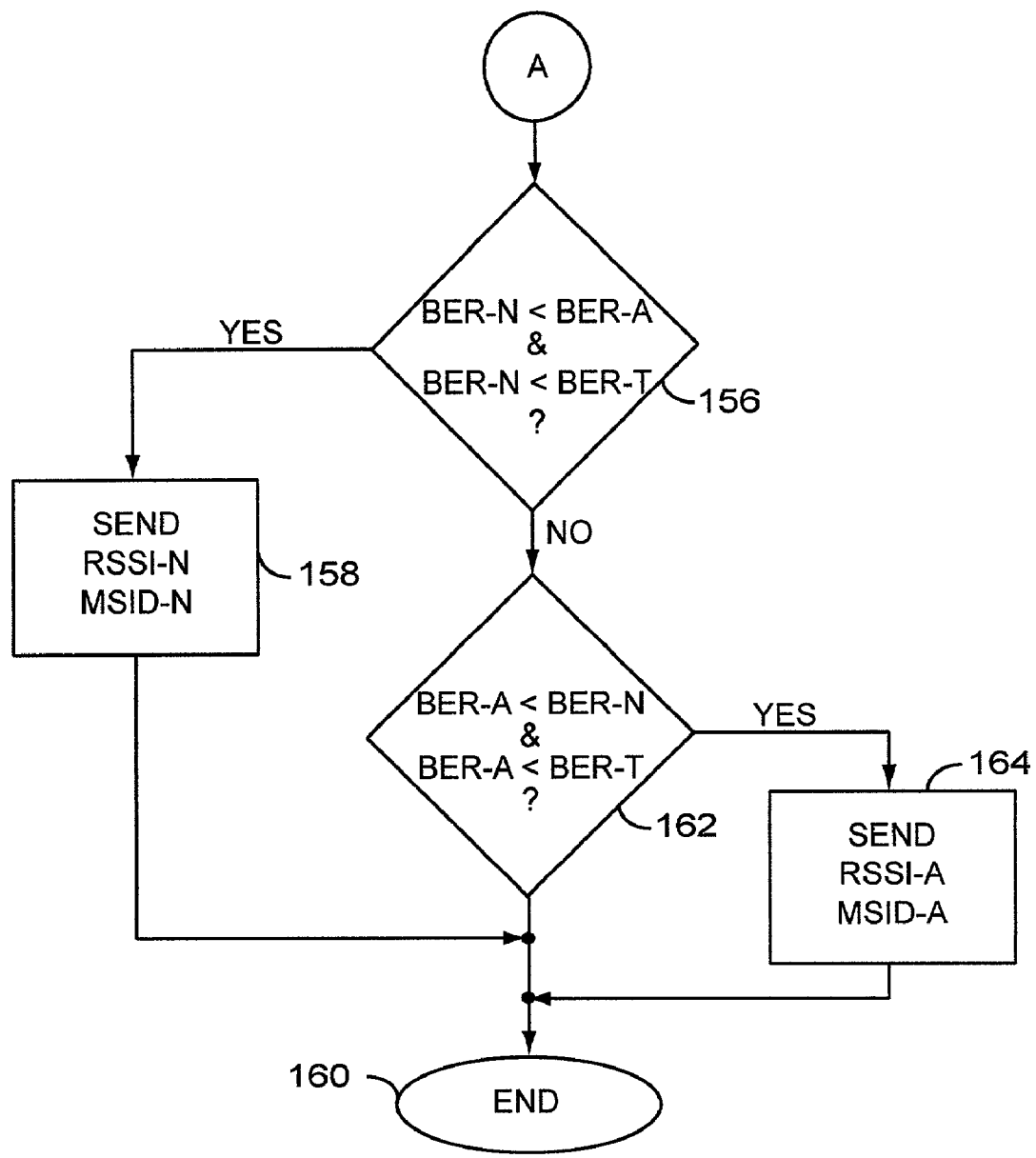

Continuing with FIG. 12B, the receiver controller 44 compares the bit error rate estimate for the first data set against the bit error rate estimate for the second data set (step 156). In other words, the controller 44 determines whether the normal burst assumption produced a lower bit error rate than the abbreviated burst assumption. Additionally, the controller 44 compares the lower of the two computed bit error rate estimates against a predefined bit error rate threshold, which is set at a value such that computed bit error rates in excess of the threshold suggests unreliable data. For example, the error rate threshold might be set at 10%.

If the normal burst bit error rate estimate is below the abbreviated burst bit error rate estimate and also is below the pre-defined threshold, the receiver controller 44 sends the received signal strength measurement and mobile station identifier determined for normal burst processing to the base station controller 30 (step 158), and processing ends for that burst (step 160). Conversely, if the bit error rate estimate for the abbreviated burst is less than the bit error rate estimate for the normal burst, and, at the same time, the abbreviated burst bit error rate estimate is below the pre-defined threshold (step 162), the receiver controller 44 sends the received signal strength mobile station identifier for the abbreviated burst to the base station controller 30 (step 164).

As those skilled in the art will readily appreciate, the above details are exemplary and not limiting. For example, many RF transceivers used in TDMA-based networks are set up for a particular type of two-pass burst decoding. Such two-pass decoding is used because it is generally not known whether a given access burst relates to a regular traffic channel or a fast associated control channel (FACCH). Note that these variations in burst type are independent of the normal and abbreviated variations of mobile-originated access bursts. That is, both traffic and FACCH bursts are used within a given cell 12, but only one of normal or abbreviated configurations is used in that cell 12.

Because reception of FACCH bursts is part of normal digital traffic channel (DTC) burst processing, a given base station 10 uses the Cyclic Redundancy Check (CRC) value received in a FACCH burst to insure that the burst originated from within its corresponding cell 12. CRC values identify the particular base station 10 for which a burst is intended because they are computed based in part on that base station's Coded Digital Verification Color Code (CDVCC). Thus, under normal operating conditions, a given base station 10 verifies the CRC of received bursts (FACCH and non-FACCH) to ensure that the bursts are meant for it. Since the present invention involves a measurement mode where, by definition, bursts are processed from surrounding cells 12, the CRC value is not used.

In any case, decoder 42 may be dimensioned for traffic/FACCH two-pass operation, which perfectly complements the inventive approach to normal- and abbreviated-type burst decoding described herein. However, one notes that, if the compute cycles were not already allocated to two-pass decoding operations, time might be saved by modifying the above approach.

As an example of such time saving, the decoder 42 might decode the full bit set assuming a normal burst was received, and then determine, along with the receiver controller 44, the bit error rate estimate for normal-burst processing (or abbreviated-burst processing). If that error rate was below the defined error threshold, the receiver 34 might forgo second-pass abbreviated-burst processing (or normal-burst processing), since it would have already deemed the data set obtained by the first assumption as good or within acceptable error limits. This mode of operation relies on the likelihood that a received burst will produce acceptable (low error) results for only one of the processing assumptions.

In general, the present invention provides a network receiver 34 that, in an exemplary measurement mode of operation, for example, receives and processes both normal-type and abbreviated-type access bursts. Upon receiving an access burst, the receiver 34 processes the burst first assuming one of the two access types, and then again assuming the other access type. It then compares bit error rate estimates for the two data sets obtained from the two processing assumptions, and retains the data set having the lower error rate, assuming that this rate is also below the pre-defined error threshold. Thus, the present invention is not limited by the foregoing details; rather it is limited only by the scope of the following claims, and their reasonable equivalents.

What is claimed is:

1. A method of collecting signal information in a wireless communication network having a plurality of coverage areas and a network receiver sited in each coverage area, the method comprising:
   receiving access bursts at the network receiver in a given coverage area from mobile stations operating within the given coverage area, and from mobile stations operating in other coverage areas;
   processing each access burst as a normal burst to obtain first data;
   processing each access burst as an abbreviated burst to obtain second data;
   determining first and second error rates for the first and second data, respectively; and
   retaining either the first or second data depending on which data exhibits a lower error rate.

2. The method of claim 1, wherein processing each access burst as a normal access burst comprises:
   demodulating the access burst to recover a first set of bits; and
   de-interleaving the first set of bits using a first de-interleaving scheme that is pre-defined for normal bursts to generate a first set of de-interleaved data.

3. The method of claim 2, wherein determining the first error rate for the first data comprises:
   decoding the first set of de-interleaved data to obtain the first data;
   re-encoding the first data using a normal-burst encoding scheme to obtain re-encoded first data; and
   comparing bit errors between the re-encoded first data and the first set of de-interleaved data.

4. The method of claim 3, further comprising extracting a mobile station identifier (MSID) from the first set of de-interleaved data.

5. The method of claim 1, wherein processing each access burst as a normal burst to obtain first data, and processing each access burst as an abbreviated burst to obtain second data comprises determining first and second received signal strength estimates for the access burst assuming a normal and abbreviated burst structures, respectively.

6. The method of claim 5, further comprising retaining the first signal strength as part of the retained data if the first data is retained, or retaining the second signal strength as part of the retained data if the second data is retained.

7. The method of claim 2, wherein processing each access burst as an abbreviated access burst comprises:
   extracting an abbreviated second set of bits from the first set of bits;
   de-interleaving the second set of bits using a second de-interleaving scheme that is pre-defined for abbreviated bursts to generate a second set of de-interleaved data.

8. The method of claim 7, wherein determining the second error rate for the second data comprises:
   decoding the second set of de-interleaved data to obtain the second data;
   re-encoding the second data using an abbreviated-burst encoding scheme to obtain re-encoded second data; and
   comparing bit errors between the re-encoded second data and the second set of de-interleaved data.

9. The method of claim 7, further comprising extracting a mobile station identifier (MSID) from the second set of de-interleaved data.

10. The method of claim 1, wherein each coverage area of the wireless communication network has an assigned control channel frequency used by mobile stations in the coverage area to transmit access bursts, and wherein selected ones of the coverage areas have the same assigned control channel frequency, and further comprising:
    designating a selected control channel frequency as a test frequency; and placing in the measurement mode the network receiver in each coverage area that uses the test frequency as the assigned control channel frequency; and collecting retained data at the network receivers operating in the measurement mode.

11. The method of claim 1, wherein processing each access burst as an abbreviated burst to obtain second data comprises selectively processing the access burst as an abbreviated burst depending on whether the first error rate determined for the first data exceeds a pre-defined error threshold.

12. A wireless network base station including a receiver having a measurement mode of operation, and wherein the receiver comprises:
 a receiver front-end to generate a baseband signal from a received access burst;
 a demodulator to generate a first set of bits by demodulating the baseband signal based on assuming that the received burst is a normal type burst;
 a decoder to, when operating in the measurement mode, de-interleave the first set of bits using a normal burst de-interleaving scheme to generate first de-interleaved data, and to de-interleave a subset of the first set of bits using an abbreviated burst de-interleaving scheme to generate second de-interleaved data, and further to decode the first de-interleaved data using normal burst decoding to generate first data, and to decode the second de-interleaved data using abbreviated burst decoding to generate second data; and
 a first controller to, when operating in the measurement mode, determine error rates for the first and second data, and to retain one of the first and second data as retained data, depending on which of the first and second data exhibits a lower error threshold, and on whether the lower of the first and second error rates is below a defined error threshold.

13. The wireless network base station of claim 12, further comprising a base station controller to control whether or not the receiver operates in measurement mode.

14. The wireless network base station of claim 12, further comprising memory to store the retained data.

15. The wireless network base station of claim 12, further comprising a network interface to communicate the retained data to another wireless network entity for post-processing.

16. The wireless network receiver of claim 12, wherein the demodulator determines a first received signal strength assuming the received access burst is a normal access burst, and further determines a second received signal strength assuming the received access burst is an abbreviated access burst.

17. The wireless network receiver of claim 12, wherein the first controller retains a mobile station identifier and a received signal strength estimate as part of the retained data.

18. The wireless network receiver of claim 17, wherein the demodulator determines a first received signal strength estimate for the received access burst assuming the received access burst is a normal burst, and determines a second received signal strength assuming the received access burst is an abbreviated access burst.

19. The wireless network receiver of claim 18, wherein either the first or second received signal strength estimate is retained by the first controller as the received signal strength estimate in the retained data depending on whether the first or second data exhibits the lower error rate.

20. The wireless network receiver of claim 12, wherein the decoder decodes a first mobile station identifier from the first de-interleaved data as part of the first data, and decodes a second mobile station identifier from the second de-interleaved data as part of the second data.

* * * * *